United States Patent [19]

Zrostlik et al.

[11] 4,314,597
[45] Feb. 9, 1982

[54] TIRE MOUNTING AND DEMOUNTING APPARATUS AND METHOD

[75] Inventors: Francis L. Zrostlik; John J. Collins, both of Garner, Iowa

[73] Assignee: Iowa Mold Tooling Co., Inc., Garner, Iowa

[21] Appl. No.: 109,681

[22] Filed: Jan. 4, 1980

Related U.S. Application Data

[63] Continuation-in-part of Ser. No. 945,915, Sep. 26, 1978, abandoned.

[51] Int. Cl.$^3$ .............................................. B60C 25/06
[52] U.S. Cl. .................................................. 157/1.11
[58] Field of Search ................. 157/1, 1.1, 1.17, 1.11, 157/1.28; 269/238

[56] References Cited

U.S. PATENT DOCUMENTS

| | | | |
|---|---|---|---|
| 2,665,747 | 1/1954 | Harrison | 151/1.1 |
| 2,903,049 | 9/1959 | Carlson | 157/1 |
| 2,907,379 | 10/1959 | Tuttle | 157/1.1 |
| 2,908,114 | 10/1959 | Fouse | 269/238 X |
| 3,051,224 | 8/1962 | Pearne | 157/1.28 |
| 3,612,140 | 10/1971 | Malinski | 157/1.17 |
| 3,971,426 | 7/1976 | West et al. | 157/1.28 |
| 4,031,941 | 6/1977 | Malinski et al. | 157/1.17 |
| 4,093,015 | 6/1978 | Malinski | 157/1.1 |

FOREIGN PATENT DOCUMENTS 2238604 2/1975 France .............................. 157/1.28

*Primary Examiner*—James G. Smith

*Attorney, Agent, or Firm*—Wegner, Stellman, McCord, Wood & Dalton

[57] ABSTRACT

Apparatus for mounting and demounting tires and methods of mounting and demounting tires. The apparatus may include a clamp for holding a wheel as well as a tire clamp and pushing device for gripping a tire and applying a moving force thereto. The tire clamp is mounted for movement toward and away from the wheel clamp and toward and away from a support for the wheel clamp. It is operated, during tire mounting, to nonaxially urge a tire having one part of one bead received in the drop center of a wheel away from the wheel to draw that part into the drop center while axially moving the tire at a remote location toward the wheel so that the beads at the remote location are disposed between the flanges of the wheel. Both beads at the remote location are also brought towards each other into sufficient proximity so that both may enter the drop center of the wheel and thereafter, the tire is nonaxially urged at the remote location toward the wheel to dispose both the beads at the remote location within the drop center of the wheel. Thereafter, the tire is axially moved toward the wheel causing the remaining part of the bead to be received between the wheel flange. In demounting the tire, the tire clamp is utilized to bring the beads at one location into sufficient proximity such that both may enter the drop center of the wheel and thereafter, the tire is nonaxially urged in a direction to cause both of the beads to enter the drop center of the wheel. Oppositely therefrom, the tire is axially moved away from the wheel until both beads at the opposite location, are moved from between the wheel flanges.

23 Claims, 23 Drawing Figures

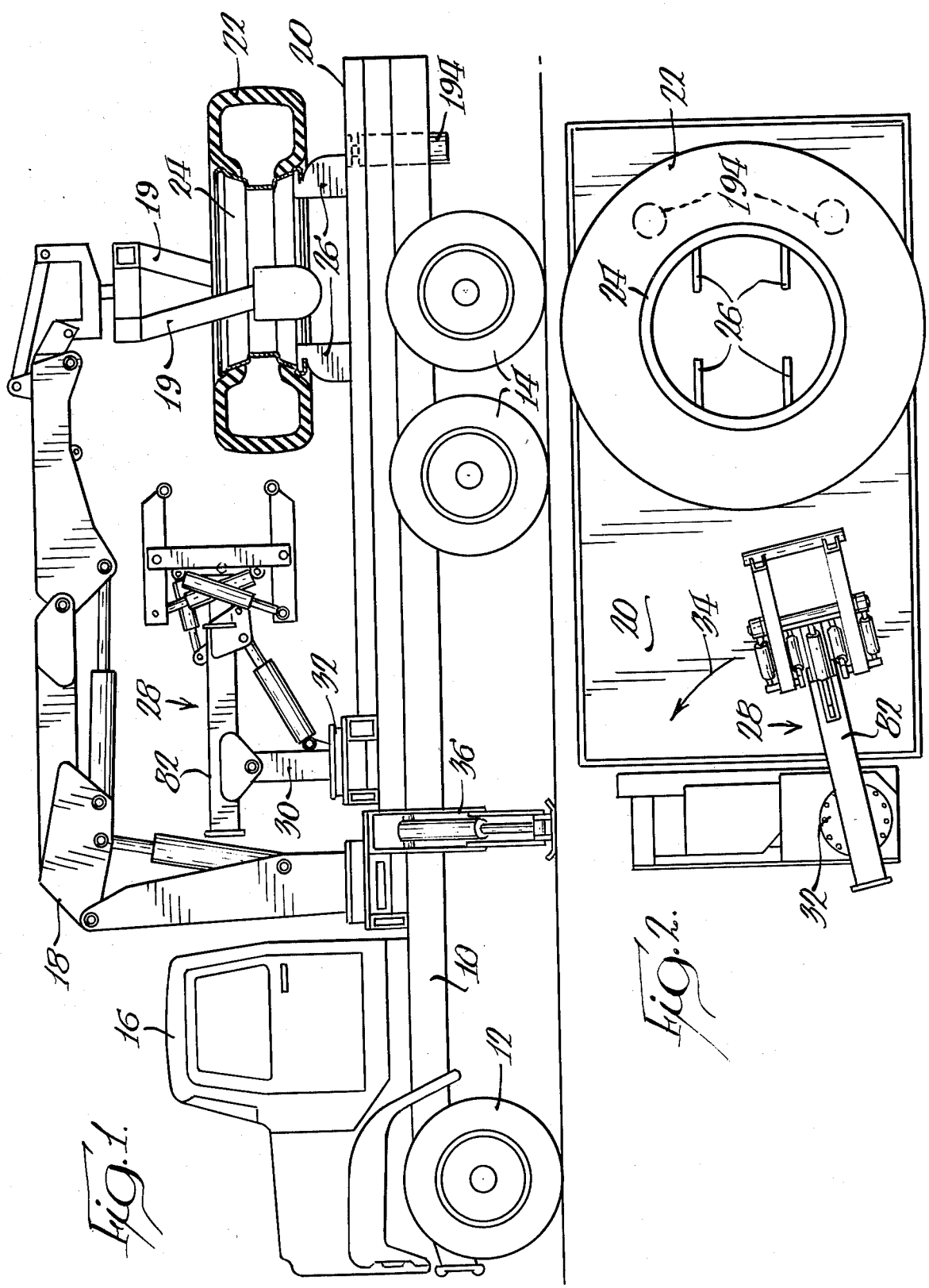

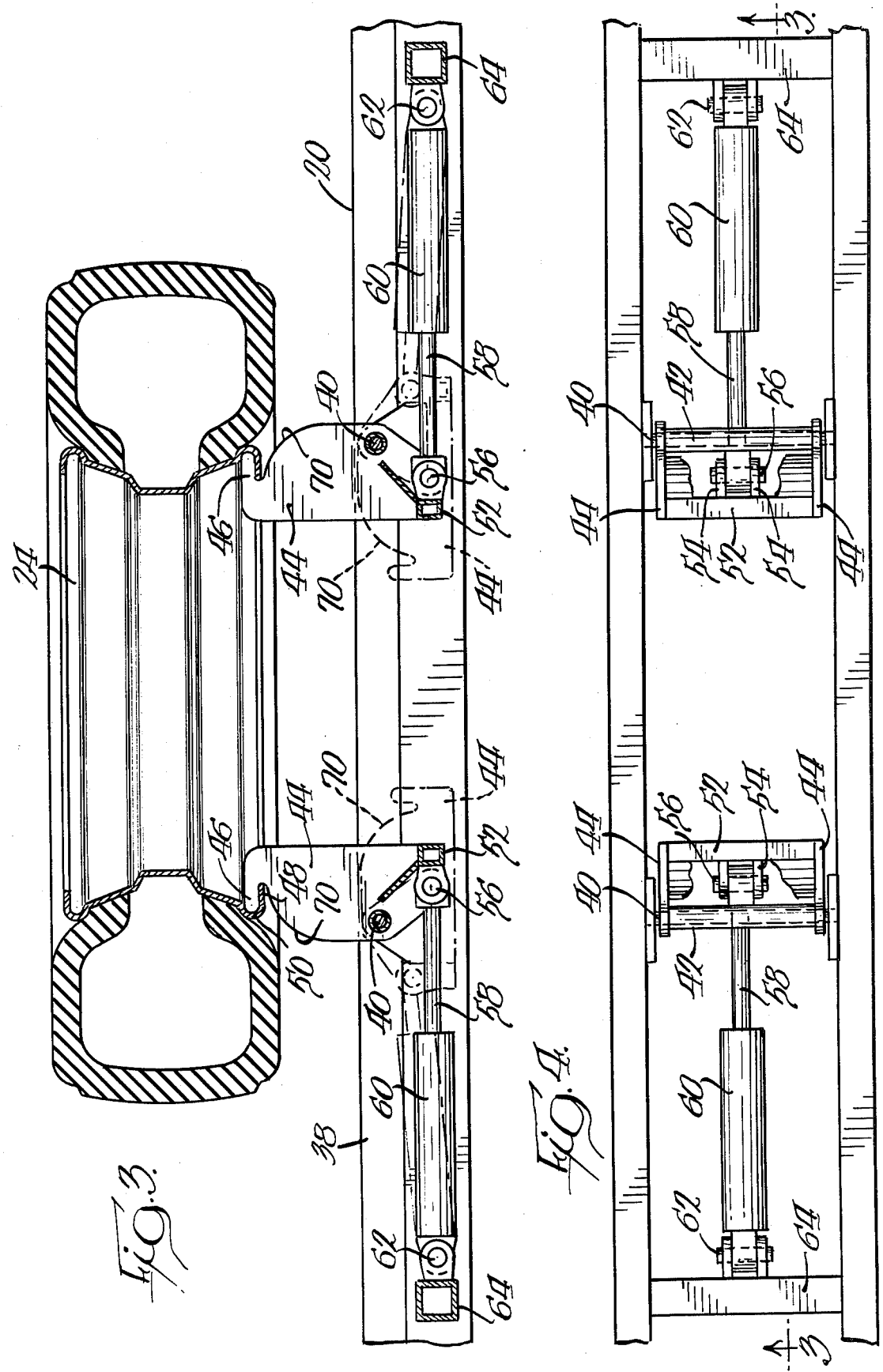

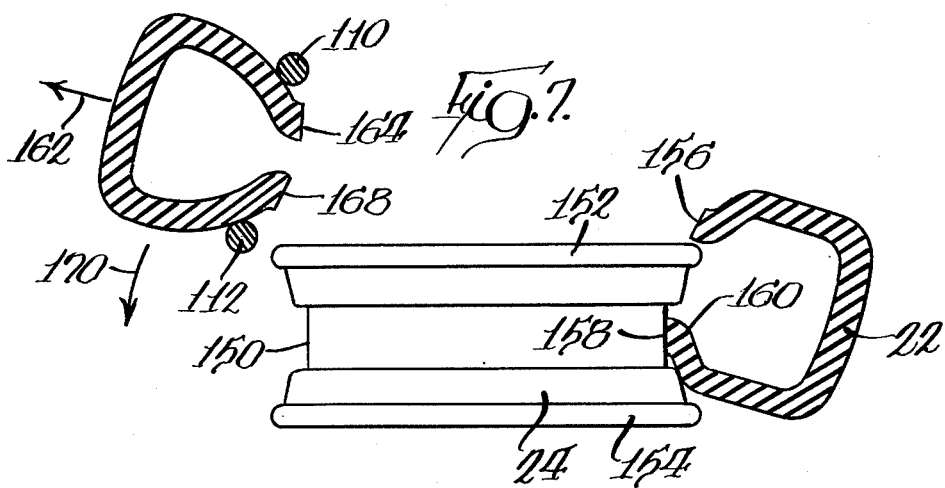
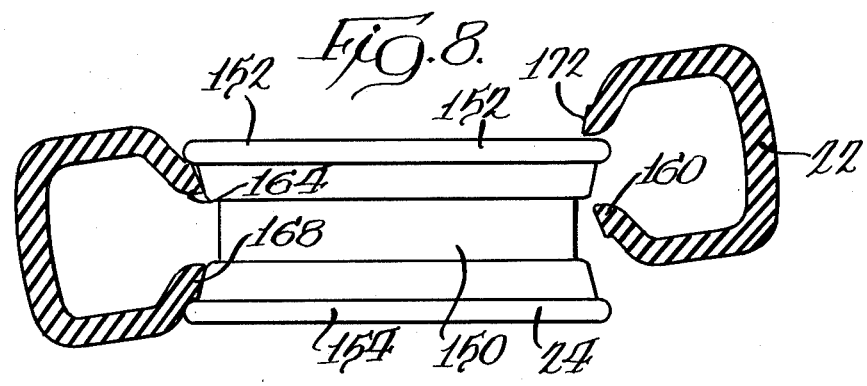
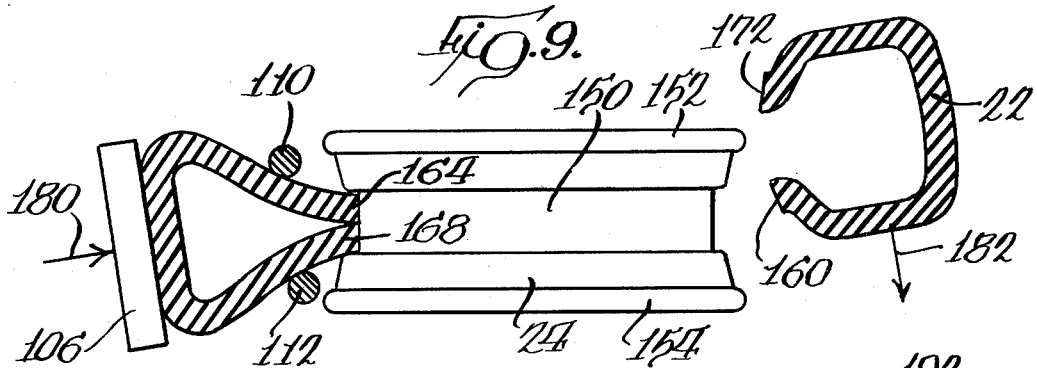
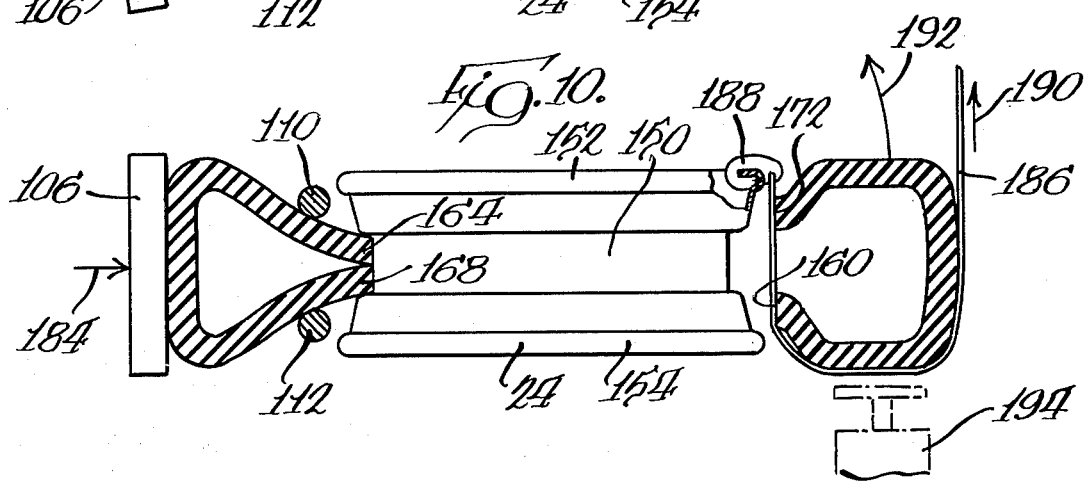

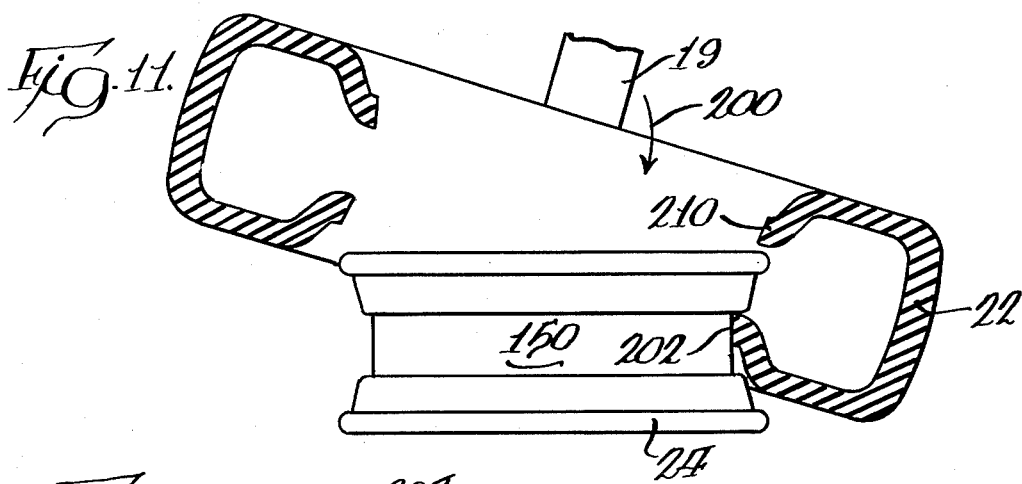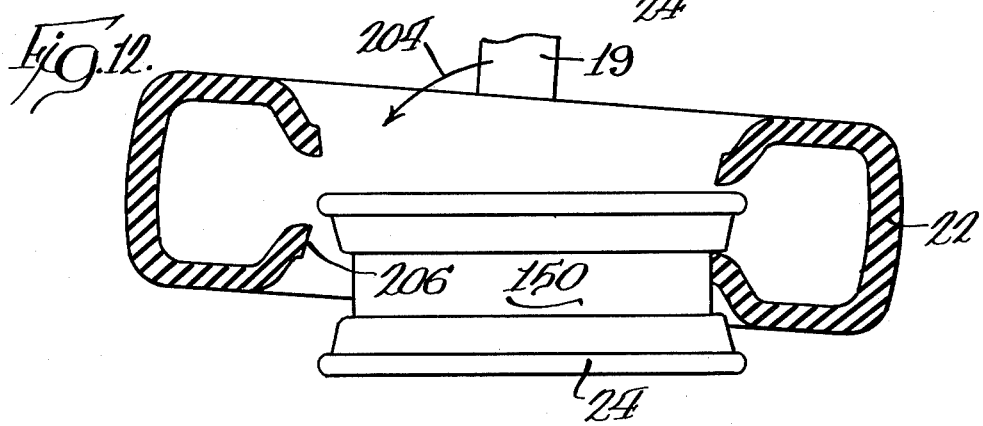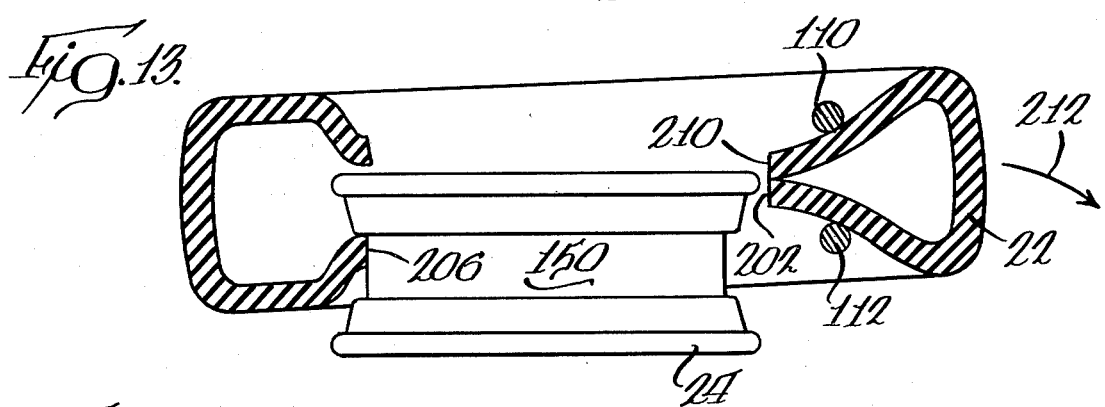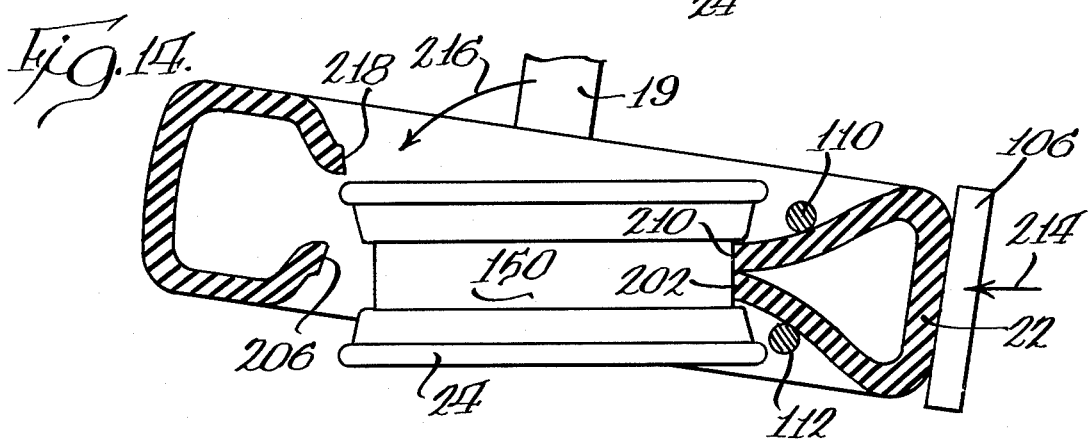

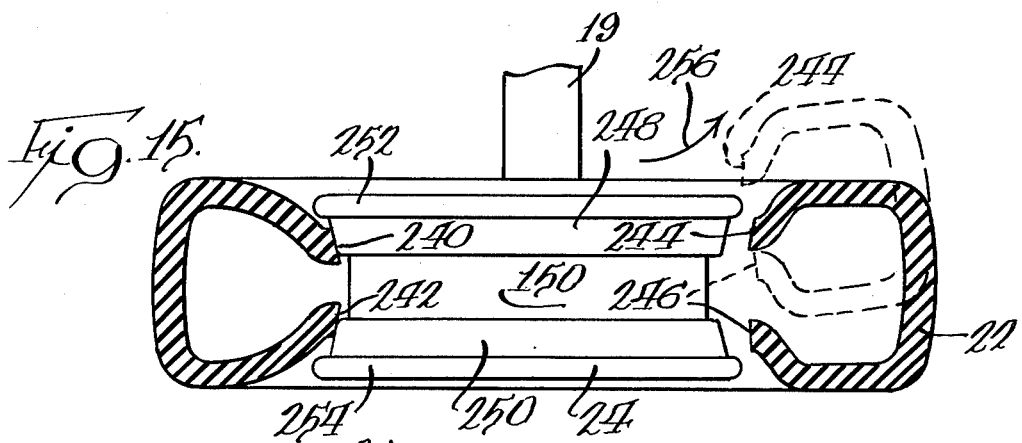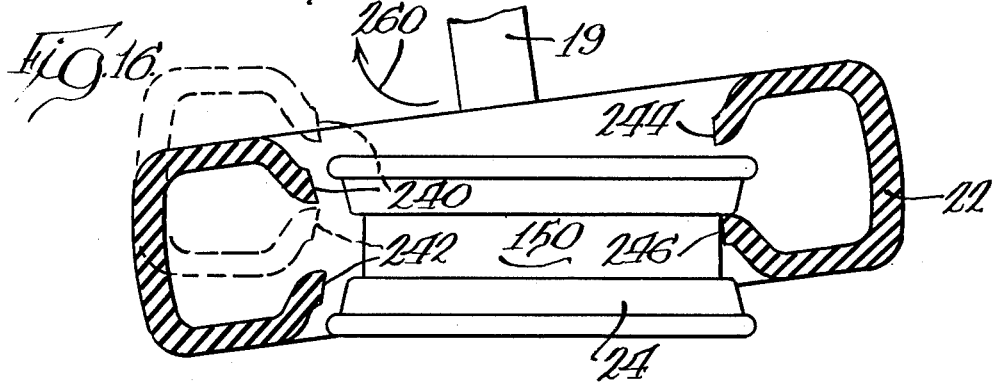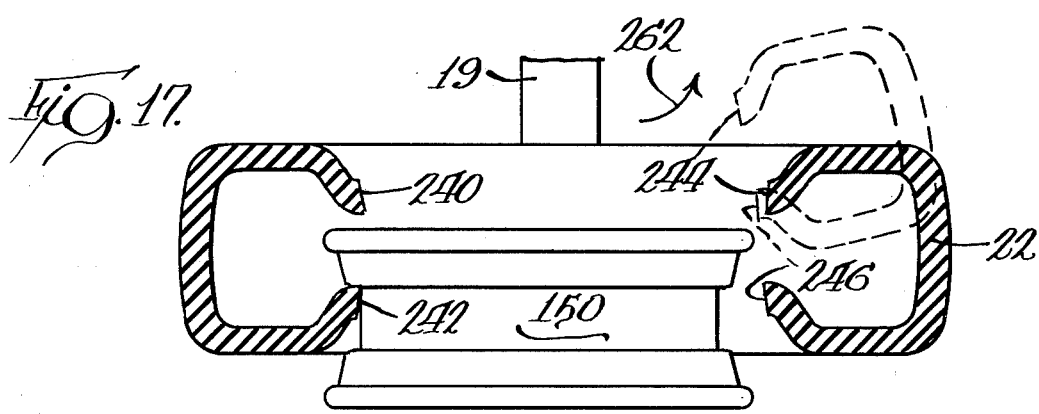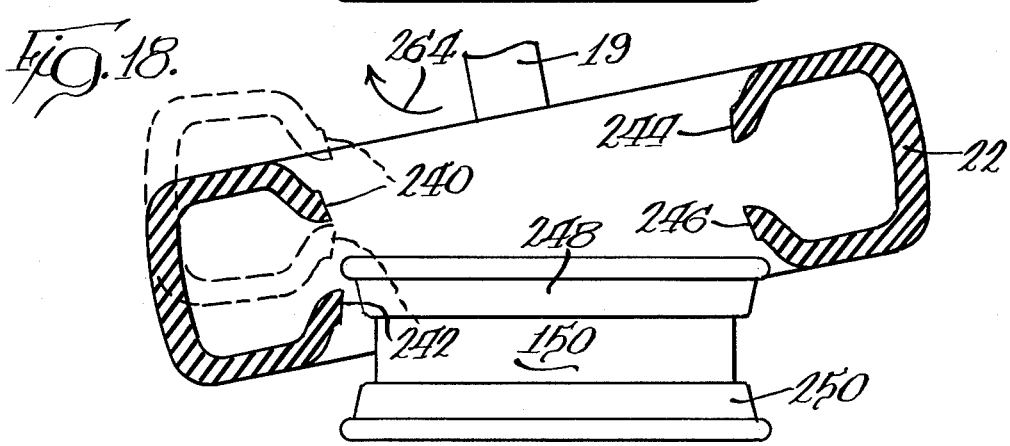

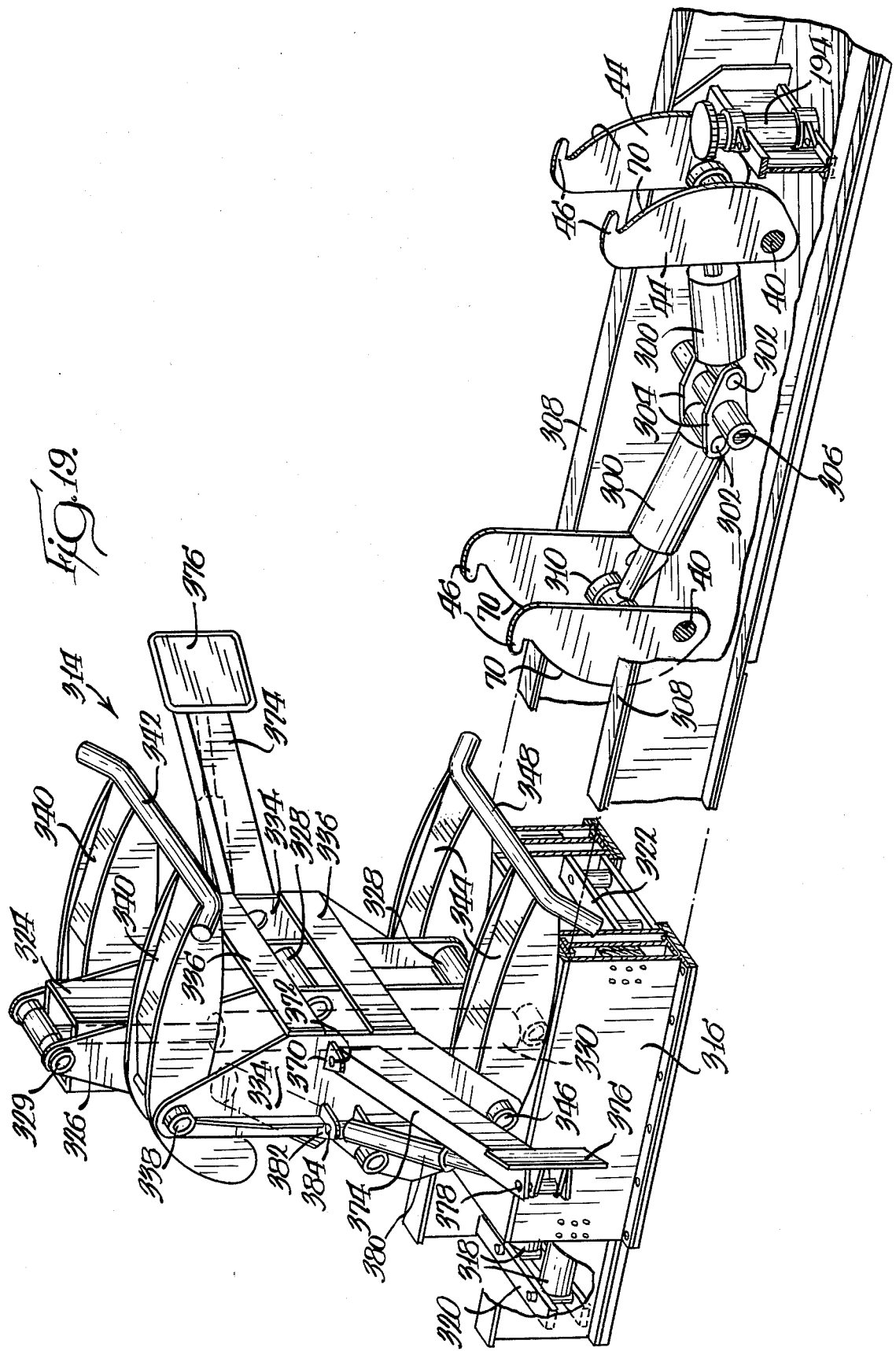

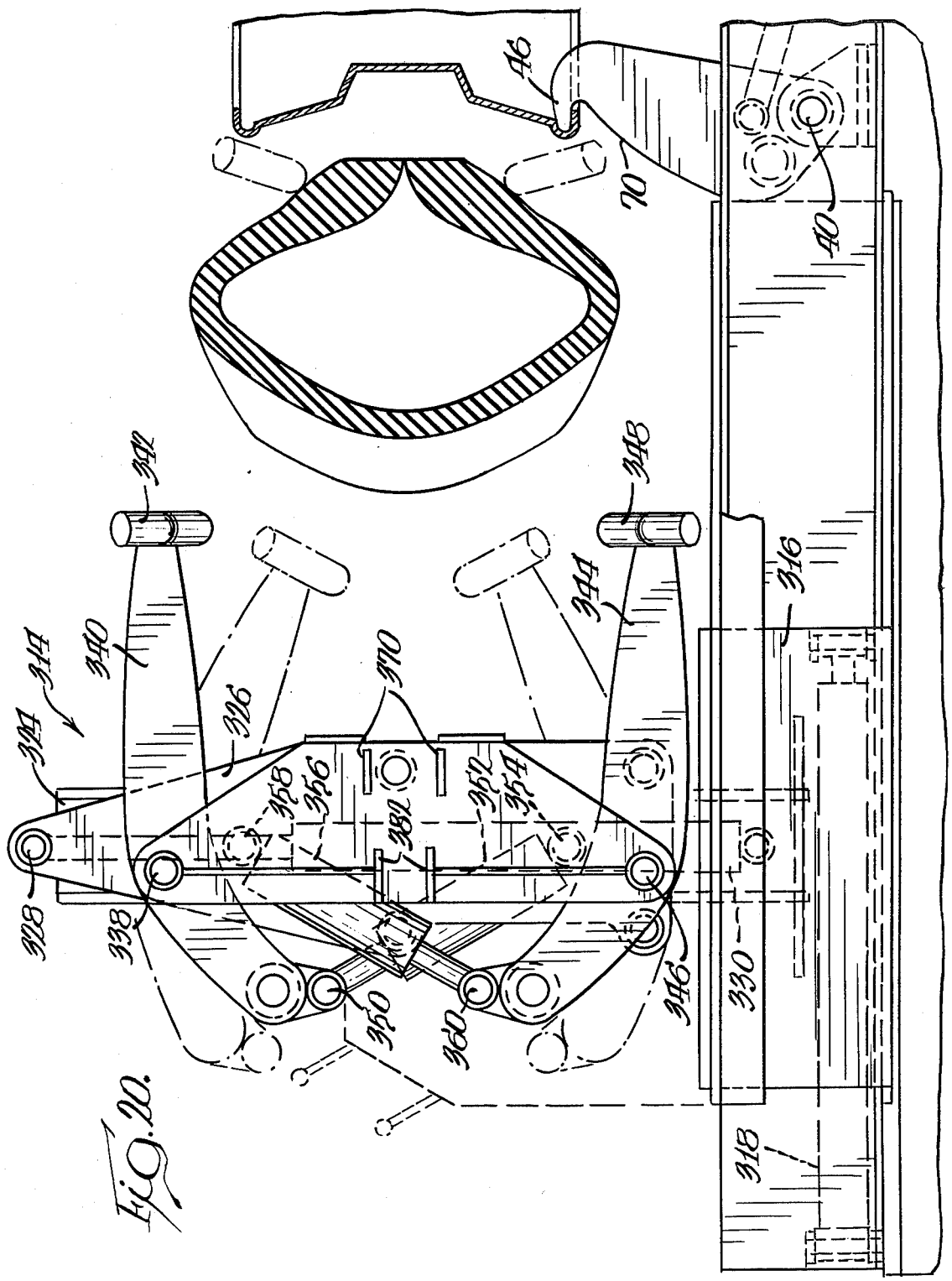

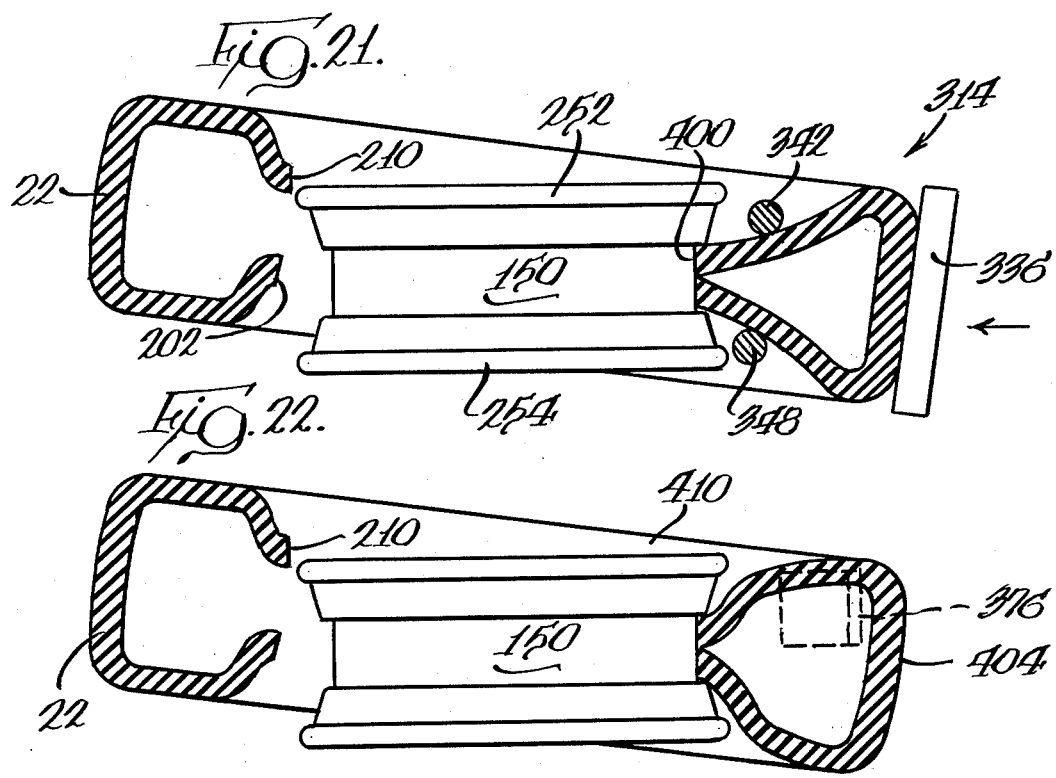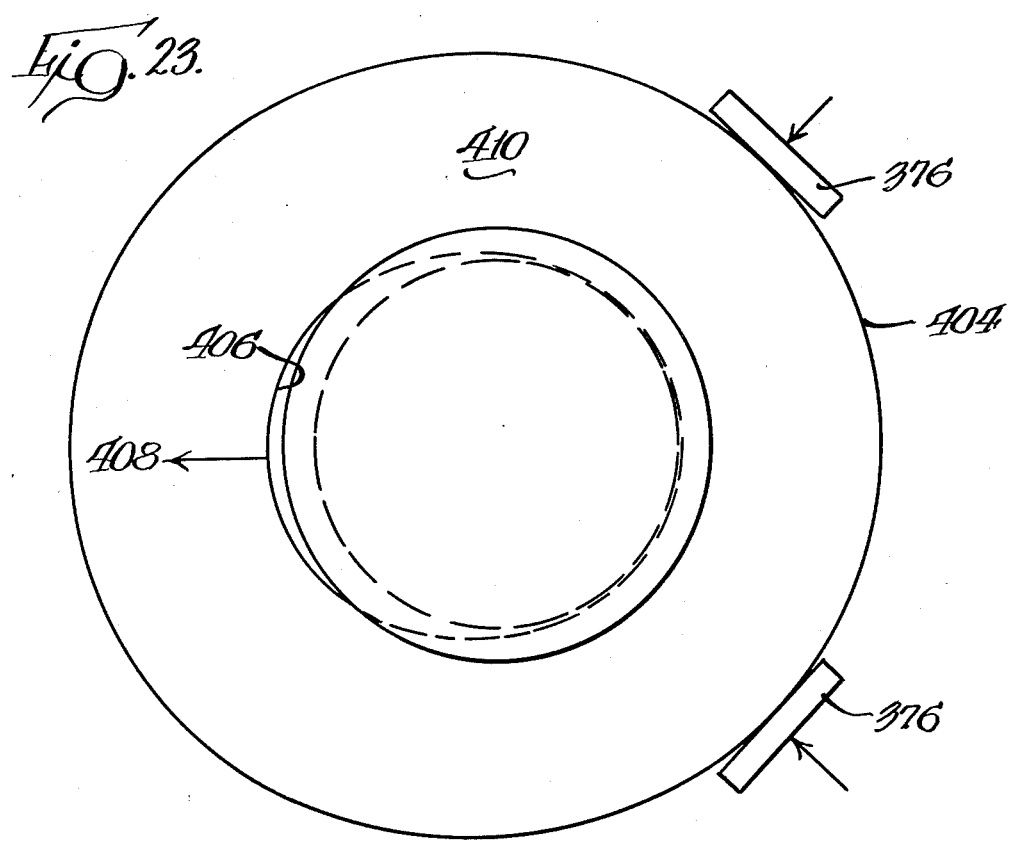

4,314,597

TIRE MOUNTING AND DEMOUNTING APPARATUS AND METHOD

CROSS REFERENCE

This application is a continuation-in-part of my co-pending application Ser. No. 945,915, filed Sept. 26, 1978 now abandoned.

BACKGROUND OF THE INVENTION

This invention relates to methods and apparatus for mounting and demounting tires, particularly large tires as are typically employed with oversized vehicles as off the road vehicles.

While automobiles have utilized tires mounted on one-piece wheels having drop centers for decades, little use of such wheels has been made in connection with larger vehicles requiring tires significantly larger than those used on automobiles. Rather, where large tires have been required, conventionally so-called "split-rim" type wheels have been utilized.

The latter type of wheel has been favored over the former for mounting large tires because due to the stiffness of large tires, it has been virtually impossible to mount the same on one piece wheels. However, split-rim type wheels are not without their disadvantages for they are formed of multiple components including two wheel halves, a locking ring and one or more sealing gaskets at the very least. And, it is necessary to disassemble a split-rim type wheel for the purpose of either mounting a tire thereon or removing a tire therefrom. The seals or gaskets require replacement and a certain degree of hazard is present when the locking ring is applied to the wheel or removed therefrom.

In order to avoid these disadvantages, and attain the advantages normally associated with one-piece type wheels in connection with larger tires, there have been proposed methods and apparatus for mounting and demounting large tires on one-piece wheels. Such proposals are exemplified by, for example, the following U.S. Pat. No.: 3,489,198 issued Jan. 13, 1970 to Malinski; U.S. Pat. No. 3,612,140 issued Oct. 12, 1971 to Malinski; U.S. Pat. No. 4,014,375 issued Mar. 29, 1977 to Malinski et al; and U.S. Pat. No. 4,031,941 issued Feb. 17, 1976, also to Malinski et al.

Apparatus stated to be manufactured under one or more of the above patents is commercially available and has made it possible to mount large tires, such as those used on off the road vehicles, on one-piece rims. However, the apparatus utilized is quite complex utilizing numerous pushing devices for distorting a tire during the mounting or demounting process as well as rotating bead deflector mechanisms. The methods by which the tires are mounted or demounted are relatively complex in terms of the number of steps which must be performed.

And the locale in which the equipment is used, of necessity, cannot be utilized for non-mounting or demounting purposes by reason of the construction of the equipment preventing such use.

SUMMARY OF THE INVENTION

A principal object of the invention is to provide new and improved apparatus for mounting and demounting large tires on one-piece rims. Another principal object of the invention is to provide new and improved methods for mounting and demounting such tires.

According to one aspect of the invention there is provided a method of mounting a tire having opposed, normally spaced beads on a drop center wheel comprising the steps of disposing the tire partly on the wheel such that part of one of the beads is between the flanges of the wheel, nonaxially urging at a location remote from the bead part, the tire away from the wheel to draw the bead part into the drop center while axially moving the tire at the remote location toward the wheel so that the beads at the remote location are disposed between the flanges of the wheel, bringing both beads at the remote location toward each other into sufficient proximity such that both may enter the drop center of the wheel, nonaxially urging the tire at the remote location toward the wheel to dispose both beads at the remote location within the drop center of the wheel, and axially moving the tire adjacent the first mentioned bead part toward the wheel to cause the part of the bead opposite the bead part to be disposed between the wheel flanges.

According to another aspect of the invention, there is provided a method of demounting a tire from a drop center wheel including the steps of bringing the beads at one location about the periphery of the tire, into sufficient proximity such that both beads at that location may enter the drop center of the wheel, nonaxially urging the tire in a direction to cause both of the beads at that location to enter the drop center of the wheel, and axially moving the tire away from the wheel at a location generally opposite the first mentioned location until both beads at the opposite location are moved from between the wheel flanges.

According to still another aspect of the invention, there is provided tire servicing apparatus including a bed. Wheel clamp means are mounted for movement between a wheel clamping position above the bed and a retracted position below the bed to free the bed of obstructions to enable use of the same for other purposes. Tire clamp and urging means for gripping a tire and for applying a moving force to a tire are provided and means mount the tire clamp and urging means for movement (a) toward and away from the wheel clamp means and (b) toward and away from the bed.

According to still another aspect of the invention, there is provided a tire servicing apparatus including a base with a boom pivotally mounted thereon. An extendable member is mounted for reciprocation on the boom and a jaw and pusher structure is provided. The jaw and pusher structure includes an elongated pusher means pivotally mounted intermediate its ends to the extendable member and opposed, toothless jaws, mounted on the pusher means in spaced relation to each other. At least one of the jaws is movably mounted on the pusher means for movement toward and away from the other jaw and both of the jaws extend away from the pusher means oppositely from the extendable member.

Other objects and advantages will become apparent from the following specification taken in connection with the accompanying drawings.

DESCRIPTION OF THE DRAWINGS

FIG. 1 is a side elevation of a tire servicing apparatus made according to the invention and mounted on a vehicle;

FIG. 2 is a plan view of the apparatus omitting vehicle structure;

FIG. 3 is an enlarged, sectional view of a wheel clamping apparatus taken approximately along the line 3—3 in FIG. 4;

FIG. 4 is an enlarged, fragmentary view of the clamping apparatus with parts broken away for clarity;

FIGS. 7-9 are schematics illustrating sequential steps in one method of mounting a tire;

FIG. 10 is a schematic illustrating one method of demounting a tire;

FIGS. 11-14 are schematics illustrating sequential steps in another method of mounting a tire;

FIGS. 15-18 are schematics illustrating sequential steps in another method of demounting a tire.

FIG. 19 is a perspective view of a modified embodiment;

FIG. 20 is a side elevation of the modified embodiment; and

FIGS. 21-23, inclusive, illustrate a modified tire mounting method using the apparatus shown in FIGS. 19 and 20.

DESCRIPTION OF THE PREFERRED EMBODIMENT

Figure 5:
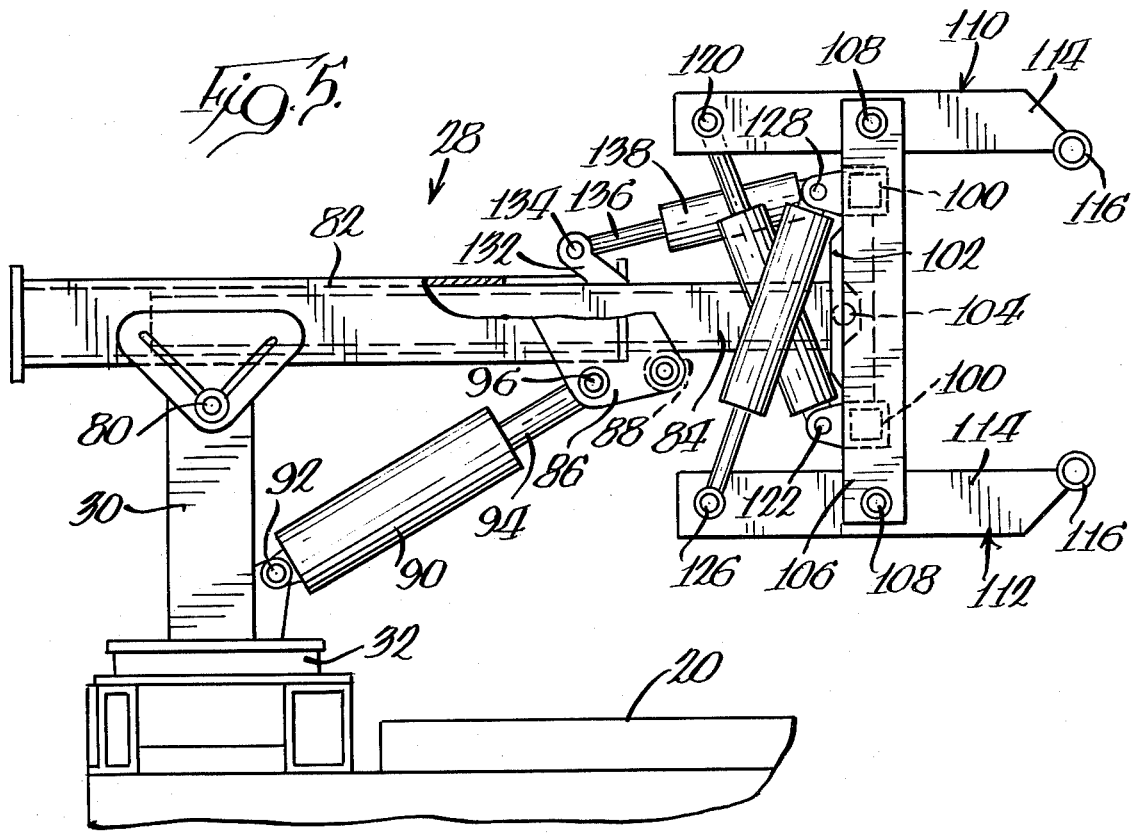
FIG. 5 is an enlarged side elevation of the tire servicing apparatus with parts broken away for clarity.

An exemplary embodiment of a tire servicing apparatus made according to the invention is illustrated in the environment of a vehicle such as a service truck 10 (FIG. 1) having wheels 12 by which the truck 10 can traverse the underlying terrain to move the servicing apparatus to a point of use. Mounted on the truck just to the rear of a cab 16 is an articulated, tire handling crane 18 made according to U.S. Pat. No. 3,927,778, issued Dec. 23, 1975 to Zrostlik, the details of which are herein incorporated by reference. For present purposes it is sufficient to note that the crane 18 has hydraulically operated, opposed grippers 19 which can grasp a tire on a diameter thereof to be (a) elevated or lowered, (b) rotated about its cylindrical axis (c) swing to either side of the truck, or (d) rotated about an axis extending between the grippers 19.

Rearwardly of the crane 18, the truck mounts a bed 20 which can be alternately used for transporting tires and/or wheels or for receiving a tire and wheel for mounting or demounting purposes. As illustrated in FIG. 1, a large tire 22 mounted on a one-piece rim 24 is secured to the bed 20 by clamp means 26 for demounting. The crane 18 may be used for loading or unloading the bed 20 and for mounting and demounting tires.

Adjacent one side of the bed, a tire clamp and urging means, generally designated 28 is provided and, as will be seen, is utilized during tire mounting and demounting operations in connection with the clamping means 26.

The tire clamp and urging means 28 includes a generally vertically oriented post 30 mounted for rotation about a generally vertical axis in a conventional ring bearing 32 secured to the truck 10 to one side of its center line. Thus, as can be determined from FIG. 2, the tire clamp and urging means 28 can be swung from the position whereat it is disposed for tire mounting or demounting operations in a counterclockwise direction just short of 90° in the direction of an arrow 34 so as not to overlie the bed 20 thereby making the bed 20 fully available for receipt of materials to be transported.

For stabilization purposes during loading or unloading of the bed 20 by the crane 18, a plurality of outriggers 36 (only one of which is shown) of conventional construction may be provided.

Turning now to FIGS. 3 and 4, the nature of the clamping means 26 will be described in greater detail. The upper surface of the bed is designated 38 and just below the same, a pair of spaced, parallel pivot shafts 40 are provided. Each pivot shaft 40 journals a tube 42 which in turn mounts spaced clamping plates 44 at its opposite ends. As seen in FIG. 3, the plates 44 are somewhat elongated and the tubes join thereto intermediate the ends of each plate 44.

One end of each of the plates 44 is provided with a hook formation 46 which is adapted to engage the one-piece rim 24 at the inturned end 48 of the lowermost rim flange 50.

The lower ends of the plates 44 associated with each shaft 40 are interconnected by a tube 52 having a rectangular cross-section for strengthening purposes and the same intermediate its ends mounts spaced ears 54 which receive a pivot pin 56. The pivot pins 56 are coupled to the rods 58 of corresponding hydraulic cylinders 60 which are in turn pivotally connected as at 62 to a crossmember 64 of the frame of the vehicle 10.

When the cylinders 60 are retracted, the clamping plates 44 will assume the dotted line position illustrated in FIG. 3 and it will be observed that no part thereof extends above the upper surface 38 of the bed 20. Preferably, the surface 38 is generally imperforate save for slots (not shown) aligned with the plates 44 through which the plates 44 may be elevated to the solid line position illustrated in FIG. 3.

Adjacent each of the hook formations 26, each of the plates 44 is provided with an arcuate cam surface 70 leading to the hook formation 46. It will be appreciated that when the plates 44 are in their retracted position illustrated in dotted lines, a tire and wheel or simply the wheel 24 may be approximately centered over the clamps 26. As the plates 44 are elevated to their solid line positions, the cam surfaces 70 cam the wheel 24 into a precisely centered position to be firmly gripped by the hook formations 46.

By reason of the foregoing construction, when a tire mounting or demounting operation is not to be performed, the clamps 26 may be fully retracted below the surface 38 of the bed 20 so as to not obstruct the same. Thus, the surface of the bed 20 may be used to receive articles as, for example, tires and/or wheels so as to enable the same to be transported to a desired point of use or to a location for servicing if that is required. Thus, full use of the bed 20 for transportation purposes is maintained through the use of the retractable clamps 26 while at the same time providing clamps which may hold a wheel during a mounting or demounting operation.

Figure 6:
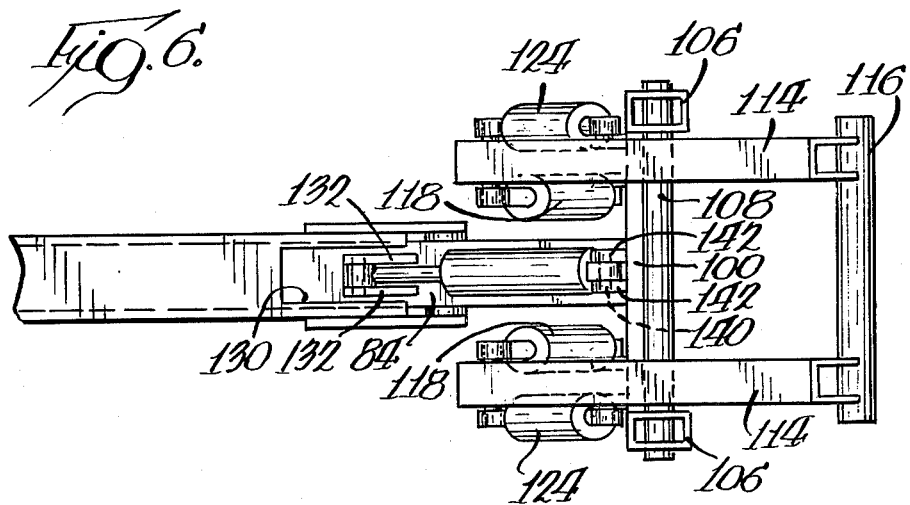
FIG. 6 is a fragmentary plan view of the apparatus shown in FIG. 5.

With reference now to FIGS. 5 and 6, the tire clamp and urging means 28 will be described in greater detail.

The upstanding post 30, by means of a pivot pin 80 pivotally mounts a boom 82 for rotation about a generally horizontal axis. The boom 82 may be formed out of heavy duty rectangular tubing and telescopingly receives an extendable member 84. A cylinder (not shown) is disposed within the boom 82 and coupled between the same and the extendable member 84 so that the latter can be moved in a reciprocal fashion between extended and retracted positions. Preferably, the boom 82, at an end remote from the post 30 mounts a collar 86 which in turn journals a roller 88 abutting the underside of the extendable member 84 to minimize friction during such movement.

A hydraulic cylinder 90 has its head end pivoted at 92 to the post 30 and its rod 94 pivoted by a pin 96 to the collar 86. As a consequence, the cylinder 90 may be operated to pivot the boom 82 and the extendable member 84 about the pivot axis defined by pin 80 towards and away from the underlying bed 20. The aforementioned cylinder contained within the boom 82 may be operated to extend the extendable member 84 towards and away from the clamping means as can be ascertained from FIG. 2.

Returning to FIGS. 5 and 6, two horizontally disposed, spaced tubes 100 are interconnected by spaced, vertically extending plates 102. A pivot pin 104 extends between the plates 102 and connects to the outer end of the extendable member 84 on a horizontal axis.

Elongated, rectangular tubes 106 which serve as a pusher means for purposes to be described interconnect the tubes 104 and at their opposite ends journal pivot pins 108. The uppermost pin 108 pivotally mounts an upper jaw, generally designated 110 while the lowermost pin 108 pivotally mounts a lower jaw, generally designated 112. Both of the jaws 110 and 112 are formed of two spaced elongated channels 114. The ends of the channels 114 of each jaw remote from the post 30 are interconnected by a cross-member formed of a tube 116 for gripping a tire without cutting the same by pivoting the jaws 110 and 112 towards each other about the pivot axis provided by pins 108.

Two cylinders 118 are pivotally connected by pivot pins 120 to corresponding channels 114 of the upper jaw 110 and by pivot pins 122 to the lower of the cross-members 100. Similar cylinders 124 are pivotally connected by pins 126 to corresponding channels 114 of the lower jaw 112 and by pins 128 to the upper one of the cross-members 100. Consequently, by energization of the cylinders 118 and 124, the jaws 110 and 112 may be made to pivot towards and away from each other to grip or release the tire.

The upper surface of the boom 84 includes a notch 130 at its end adjacent to the jaws 110 and 112 and the extendable member 84, on its upper surface, mounts a pair of spaced upstanding eyes 132. When the extendable member 84 is fully retracted into the boom 82, interference between the eyes 132 and the boom 82 is avoided by the provision of the notch 130.

As best seen in FIG. 5, the eyes 132 mount a pivot pin 134 which in turn is connected to the rod 136 of a cylinder 138. The cylinder 138 is in turn connected by a pivot pin 140 to spaced eyes 142 on the uppermost cross-member 100. Thus, by extending and retracting the cylinder 138, the jaws 110 and 112 as well as the pusher means defined by the tubes 106 can be pivoted about the pivot axis provided by the pin 104.

Suitable valves and a source of hydraulic fluid under pressure are provided for selective operation of the various cylinders to sequence the operation of the tire clamp and urging means in a manner to be described to perform mounting and demounting operations.

The manner in which the previously described apparatus is utilized in mounting and demounting tires will now be described in connection with FIGS. 7–10 inclusive.

A typical one-piece wheel 24 is illustrated in FIGS. 7–10 and is seen to include a drop center 150 and upper and lower flanges 152 and 154 respectively. The wheel 24 is clamped in place by the wheel clamps 26 in a manner described previously. A tire 22 having upper and lower, opposed, normally spaced beads 156 and 158 is disposed on the wheel 24, typically through use of the crane 18.

The tire 22 is first canted on the wheel 24 such that a part, shown at 160, of the lower bead 158 enters the drop center. Oppositely therefrom, the tire 22 is gripped on its sidewalls by the jaws 110 and 112 and by retraction of the extendable member 84, a nonaxial urging force designated by an arrow 162 is exerted on the tire 22 to bring the part 160 into the drop center 150 of the wheel 24. This results in the inner edges 164 and 168 of the upper and lower beads adjacent the jaws 110 and 112 being moved to a location whereat they will clear the upper wheel flange 152. By pivoting the boom 82 about the pivot 80 and/or the jaws 110 and 112 and pusher means 106 about the pivot 104, a generally axially moving force represented by an arrow 170 may be applied to the tire to move the tire 22 toward the wheel 24. Such movement is continued until the bead parts 164 and 168 are located between the wheel flanges 152 and 154 as shown in FIG. 8. At this point in time only a part 172 of the upper bead 156 immediately above the part 160 of the lower bead will not be disposed between the rim flanges. The jaws 110 and 112 are driven by their respective cylinders so as to cause the bead parts 164 and 168 to be brought into sufficient proximity to each other that both may simultaneously enter the drop center 150 of the wheel 24 and the extendable member 84 is then extended. This causes the pusher means 106 to engage the tread of the tire and apply a nonaxial force in the direction of an arrow 180 to move the bead parts 164 and 168 into the drop center 150 by pushing the tire towards the wheel 24. As a consequence, the bead part 172 will be moved away from the upper wheel flange 152 sufficiently to clear the same. The part of the tire 22 remote from the pusher means 106 may then move downwardly in the direction of an arrow 182 under the influence of gravity to a location whereat the entirety of both the upper and lower beads 156 and 158 are between the flanges 152 and 154. The mounting process is thereby completed.

While FIG. 8 illustrates the left-hand part of the tire 22 as being free from distortion by the jaws 110 and 112, it will be appreciated that the clamping action initiated by the steps illustrated in FIG. 7 can be maintained during this time. The various lines of applied force can easily be obtained by suitably pivoting the boom and/or the jaw structure about pivots 80 and 104 as well as by extending and retracting the extendable member 84.

To demount a wheel, the jaws 110 and 112 are brought into engagement with the sidewall of the tire 22 sufficiently to bring the immediately adjacent bead parts 164 and 168 into sufficient proximity so as to enable them to enter the drop center 150 of the wheel 24. The pusher means 106 may then be operated as previously described to apply a force to the tire 22 in the direction of an arrow 184 to urge the bead parts 164 and 168 into the drop center 150 of the rim. As a consequence, both the bead part 160 of the lower bead and the bead part 172 of the upper bead are displaced radially outwardly of the upper and lower wheel flanges 152 and 154 as shown in FIG. 10 sufficiently to enable a flexible strap 186 to be disposed under the tire 22 at a location directly oppositely of the pusher means 106 and through the space between the wheel 24 and the adjacent part of the tire 22. By means of a hook 188 secured to one end of the strap, the innermost end of the strap 186 may be firmly affixed to the wheel 24. Thereafter, an upward force in the direction of an arrow 190 may be applied to the strap 186 at its end remote from the hook 188 to move the tire 22 in a generally axial direction as shown by an arrow 192 to completely pivot the tire off of the wheel 24. Frequently, the crane 99 may be utilized to raise the strap 186.

If desired, hydraulic cylinders 194 mounted on the bed 20 may be utilized to engage the lower tire side wall to partially elevate the tire with respect to the wheel so that the beads are aligned with the drop center of the wheel.

An alternate, and highly preferred method of mounting a tire on a wheel is illustrated in FIGS. 11-14 inclusive. This method is preferred over that illustrated in FIGS. 7-9 in that it may be effected more rapidly. However, the method illustrated in FIGS. 11-14 requires the use of the crane 18 in addition to the clamping and urging means 28.

Initially, with the rim 24 clamped in place, the tire 22 is gripped by the grippers 19 and the crane 18 operated such that the tire 22 is canted with respect to the horizontal as illustrated in FIG. 11. The crane 18 is then operated to urge the tire downwardly with force being applied along a line generally illustrated by the arrow 200. This will result in the tire 22 assuming the position illustrated in FIG. 11 with respect to the rim 50. That is, a part 202 of the lower bead of the tire 22 will be disposed within the drop center 150 of the rim 24.

At this point in time, the crane 18 is then operated so as to urge the tire 22 in a direction opposite from the lower bead part 202 in the drop center 150 as well as downwardly. This line of force application is shown by an arrow 204 in FIG. 12 and results in the remainder 206 of the lower bead being disposed between the flanges of the rim 24.

The tire clamp and urging means 28 is then brought into play with the upper and lower jaws 110 and 112 squeezing the lower bead part 202 into contact with the corresponding upper bead part 210. The tire is moved by the tire clamp and urging means 28 oppositely from the lower bead part 206 and downwardly as shown by an arrow 212 so that the upper bead part 210 clears the upper rim flange of the wheel 24 and is moved toward the drop center as illustrated in FIG. 13.

With the bead parts 202 and 210 still clamped together by the jaws 110 and 112, the same are urged by the tire clamp and urging means 28 in the direction of an arrow 214 into the drop center 150 of the rim 24 while at the same time the crane 18 may apply a force in generally the same direction as well as downwardly as shown by an arrow 216 at which time the part 218 of the upper bead aligned with the part 206 will clear the upper rim flange of the wheel 24 to be located between the flanges. The tire is then ready for inflation.

FIGS. 15-18 inclusive illustrate a further method of demounting the tire from the wheel. The method illustrated in FIGS. 15-18 is somewhat slower than that illustrated in FIG. 10 but may be effected solely through the use of the crane 18, that is, without requiring the use of the tire clamp and urging means 28.

Initially, the tire 22 is in the configuration illustrated in FIG. 15 and the same is gripped by the grippers 19. The crane 18 is operated to move aligned bead parts 240 and 242 toward the drop center while moving diametrically opposite bead parts 244 and 246 away therefrom. Because of the typical slant angle portions 248 and 250 intermediate the drop center 150 and the flanges 252 and 254 of the wheel 24, the bead parts 240 will tend to be cammed inwardly and into the drop center 150 when such a force is applied.

At the same time, a canting or rotative force is applied to the tire by the crane and the combination of the forces applied is generally designated by an arrow 256. As a consequence, part of the tire will assume the dotted line position illustrated in FIG. 15 at which time the upper bead part 244 will be free of the wheel 24.

Force application to the tire 22 radially of the wheel is then reversed such that the lower bead part 246 enters the drop center 150 of the wheel. At the same time, an upward force is applied to the tire 22 and a combination of the two forces is illustrated by an arrow 260. This results in the upper bead part 240 being freed from the wheel as illustrated in dotted lines in FIG. 16.

The force application radially of the wheel is again reversed as illustrated by an arrow 262 in FIG. 17 and a canting force again applied so that the tire 22 moves from the position illustrated in slid lines in FIG. 17 to one where both the bead parts 244 and 246 are free the wheel as shown in dotted lines as is the part 240 shown in solid lines.

Force direction is again reversed as illustrated in FIG. 18 by the arrow 264 with the consequence that the remaining bead part 242 disposed between the wheel rim 248 and 250 is moved to the dotted line position illustrated in FIG. 18. At this time, the tire has been completely demounted.

Turning now to FIGS. 19 and 20, there is illustrated a modified embodiment of the tire clamp and urging means as well as a slightly different wheel clamping structure. The embodiment illustrated in FIGS. 19 and 20 is capable of performing the various tire mounting and demounting methods previously disclosed herein and is particularly adapted to perform an additional tire mounting method to be described. In the interest of brevity, in the description of the embodiments illustrated in FIGS. 19 and 20, components have a like or extremely similar counterparts in the embodiment described in connection with FIGS. 1-6 inclusive will be given like reference numbers.

Looking first at the wheel clamping means illustrated in FIG. 19, the same is basically identical to that previously described with the exception that the moving means therefor are relocated to a position between the clamp plates 44. Hydraulic cylinders 300 serve as the moving means and have their cylinder ends pivoted as at 302 to tongues 304 mounted on a pivot shaft 306 which extends between I-beam frame members 308 defining the bed. The rod ends of the cylinders 300 are pivoted to respective ones of the plates 46 as at 310. When the cylinders 30 have their rods extended, the plates 44 are moved into a clamping position with the cam surfaces 70 operating in the manner previously described.

The tire clamp and urging means shown in FIGS. 19 and 20 is generally designated 314 and includes a base carriage 316 which is slidable on the I-beams 308 towards and away from the wheel clamps. Hydraulic cylinders 318 are interposed between a cross member 320 extending between and connected to the I-beams 308 and a cross member 322 forming part of the base carriage 316. Thus, the cylinders 318, when extended, move the tire clamp and urging means 314 toward the wheel clamping structure, and in the opposite direction, when retracted.

Extending upwardly from the center of the base carriage 316 is an upright post 324. A vertically movable carriage 326 mount rollers 328 (only two of which are shown) which flank the post 324 to thereby mount the carriage 326 for movement in the vertical direction on the post 324.

At the upper end of the carriage 326, there is a pivot pin 329 which extends across the top of the post 324 just above the upper extremity of the same when the carriage 326 is in its lowermost position. A hydraulic cylinder 330 is disposed within the interior of the post 324 and has its rod end secured to the pivot pin 329. Thus, extension of the cylinder 330 will raise the carriage 326 on the post 324 while retraction of the cylinder 330 will cause the carriage 326 to be lowered.

The carriage 326 mounts, on both sides, elongated, generally vertically extending plates 334. Horizontal plates 336 extending between the plates 334 to serve as a pusher means in the same manner as the tubes 106 described earlier.

Near the upper end of the plates 334 are horizontal pivot pins 338 (only one of which is shown) which journal a pair of arms 340. The ends of the arms 340 adjacent the wheel clamps mount a cross member 342 which together therewith defines an upper jaw structure. Similar arms 344 are journalled by horizontal pivot pins 346 extending between the plates 334 and the carriage 326 and likewise mount a cross member 348 to define a lower jaw structure.

The remote ends of the upper arms 340 are pivoted as a 350 to respective hydraulic cylinders 352 which in turn are pivoted at 354 between the respective plates 334 and the carriage 326. A similar cylinder 356 is pivoted at 358 between one of the plates 334 and the carriage 326 and is pivoted at 360 to one of the lower arms 344. Accordingly, extension of the cylinders 352 and 356 will cause the jaws to close whereas retraction of the same will cause them to open.

The structure thus far described in connection with FIGS. 19 and 20 provides for the manipulation of tires to be mounted or demounted in the same fashion as described in connection with the embodiment illustrated in FIGS. 1-6, inclusive. For storage purposes, since the embodiment illustrated in FIGS. 19 and 20 does not provide for pivoting of the tire clamp and urging means about a vertical axis, it is only necessary to move base carriage 316 to its most remote location from the wheel clamping structure.

Returning to FIG. 19, apertured ears 370 on each of the side plates 334 mount vertically directed pivot pins 372 (only one of which is shown). Pins 372 journal respective horizontally directed arms 374 for rotation about their respective axis. Each of the arms 374 is provided, at its end, with a pusher shoe 376 which is pivoted thereto by a vertical pivot pin 378. Each pivot pin 378 also mounts the rod end of an associated cylinder 380 which is mounted to the associated side plate 334 by horizontally extending, apertured ears 382 and associated pivot pins 384.

Extension of the cylinders 380 will cause the shoes 376 to move in an arcuate path toward the tread area of a tire partially or wholly disposed on a wheel clamped in place by the plates 44. Retraction of the cylinders 380 will cause the opposite to occur. As will be seen, the pusher shoes 376 can be used advantageously during the mounting of a tire on a wheel according to the method illustrated in FIGS. 21-23 and to be described hereinafter.

Referring to FIG. 21, a tire 22 is first disposed on a drop center wheel such that one bead 202 is wholly between the wheel flanges 252 and 254. The other bead 210 has a part thereof shown at 400 located between the wheel rims 252 and 254 with the remainder thereof being outside of the wheel rim 252. That is, part of the bead 210 is disposed between the rims 252 and 254 at one location only. That location corresponds to one between the wheel and the tire clamp and urging means 314. This can be accomplished as desired. For example, it can be accomplished by performing the steps illustrated in FIGS. 7 and 8 and described earlier. Alternately, it can be achieved by performing the steps illustrated in FIGS. 11-13 and described earlier.

At this time, the beads at their location wherein both are inbetween the wheel flanges 252 and 254 are squeezed together by the jaws 342 and 348 as illustrated in FIG. 1 and an urging force toward the center of the tire applied by the pusher means 336 simply by extending the cylinders 318 to move the base carriage 316 toward the wheel clamp. This will cause the beads at the particular location to be urged into the drop center of the wheel. At this time, the pusher shoes 376 are brought into engagement with the tread region 404 of the tire 22 on both sides of the location whereat both beads of the tire 22 are in the drop center. Simultaneously, the squeezing force provided by the jaws 342 and 348 may be released since the force applied by the shoes 376 will maintain the beads in the drop center.

As can be seen from FIG. 23, the forces applied by respective pusher shoes 376 to the tire 22 are non-tangential and non-diametrical. They may or may not be directed along a radius of the tire 22 or the wheel 150 but they are not directed along a common diameter thereof. It is this relation that is referred to in the term non-tangential, non-diametrical, or tenses thereof as used herein.

As seen in FIG. 22, it is preferable that the force be applied to the tread region of the tire on the side thereof that is nearest the location whereat only part of one bead of the tire is within the drop center with references to the plane of the tire. As shown in FIG. 22, for a horizontal orientation of the wheel and with only part of the upper bead 210 in the drop center, the forces applied by the shoes 376 are placed upon the upper part of the tread region of the tire.

These forces cause the opening 406 of the tire upper bead 210 to tend to elongate in the direction of an arrow 408 as shown in FIG. 23. At the same time, the forces tend to cause the upper side wall 410 of the tire 22 to move downwardly. As a consequence, the part of the upper bead 210 not already between the rims 252 and 254 will tend to roll around the rim 252 and enter the space between the rims 252 and 254, thereby mounting the tire on the wheel.

It should be noted that various tire mounting and demounting methods disclosed herein need not be performed with the wheel and the tire in a horizontal position. In some applications, particularly where space requirements are of concern and it is not necessary that the apparatus be mobile as by being mounted on a truck, the components described as a truck bed or the I-beams can be mounted in a vertical plane with all other components maintaining the relation heretofor described with respect thereto.

Those skilled in the art will readily appreciate that tire mounting and demounting apparatus and methods according to the invention produce numerous advantages over those heretofore employed.

For one, the apparatus utilizes unique clamping means which are fully retractable enables dual use of the environment, that is, the bed of the servicing apparatus as, for example, storage purposes or when on a vehicle, for transportation purposes.

It will also be appreciated that the invention eliminates the need for complex, rotatable bead deflecting devices for disposing the beads between the wheel flanges. At the same time, the number of steps required for both mounting and demounting operations is reduced from those heretofore employed thereby providing a time savings in mounting and demounting operations as well.

What is claimed is:

1. A method of mounting a tire having opposed, normally spaced beads on a drop center wheel comprising the steps of
   (a) disposing the tire partly on the wheel such that part of one of the beads is between the flanges of the wheel;
   (b) nonaxially urging, at a location remote from said bead part, the tire away from the wheel to draw said part into the drop center while axially moving the tire, at said remote location, toward the wheel so that said beads at said remote location are disposed between the flanges of the wheel,
   (c) bringing both beads at said remote location towards each other into sufficient proximity that both may enter the drop center of the wheel,
   (d) nonaxially urging said tire at said remote location toward said wheel to dispose said both beads at said remote location within the drop center of the wheel; and
   (e) axially moving said tire adjacent said part toward said wheel to cause the part of the bead opposite said bead part to be disposed between the wheel flanges.

2. The method of claim 1 wherein steps (b) and (c) are performed substantially simultaneously.

3. The method of claim 1 wherein step (c) is performed at the beginning of step (b) by a clamping instrument which is also used to nonaxially urge the tire away from the wheel.

4. A method of demounting a tire having opposed beads from a drop center wheel comprising the steps of
   bringing beads, at one location about the periphery of the tire, into sufficient proximity such that both beads, at said one location, may enter the drop center of the wheel;
   nonaxially urging said tire in a direction to cause both said beads at said one location to enter the drop center of the wheel; and
   axially moving the tire away from the wheel at a location generally opposite said one location until both beads at said opposite location are moved from between the wheel flanges.

5. A method of mounting a tire having opposed, normally spaced beads on a drop center wheel comprising the steps of:
   (a) disposing the tire partly on the wheel such that part of one of the beads is between the flange of the wheel;
   (b) nonaxially urging, at a location remote from said one bead part, the tire away from the wheel to draw said one bead part into the drop center while axially moving the tire toward the wheel so that the remainder of said one bead is disposed between the flanges of the wheel;
   (c) nonaxially urging the tire relative to the wheel such that parts of both beads will move away from said wheel and bringing said both bead parts into sufficient proximity with each other so that said both bead parts may enter the drop center of the wheel while applying an axial force to said tire to move said both bead parts between the flanges of the wheel;
   (d) nonaxially urging the tire relative to the wheel so that said both bead parts enter the drop center of the wheel; and
   (e) axially urging the tire at a location remote from said both bead parts toward the wheel until the entirety of both of the beads is between the flanges of the wheel.

6. The method of claim 5 wherein at least some of said steps are performed by grippers engaging the tire on substantially diametrically opposite sides thereof.

7. A method of demounting a tire having opposed, normally spaced beads from a drop center wheel comprising the steps of:
   (a) nonaxially moving the tire relative to the wheel in one direction while rotating the tire relative to the wheel to free a part of one of the beads from the wheel;
   (b) nonaxially moving the tire relative to the wheel in the opposite direction while oppositely rotating the tire relative to the wheel to free the remainder of said one bead from the wheel;
   (c) repeating step (a) to free part of the remainder of the other bead from the wheel; and
   (d) repeating step (b) to free the remainder of said other bead from the wheel.

8. The demounting method of claim 7 wherein said wheel is fixed and said tire is moved and said relative movement is effected by grippers gripping said tire on substantially diametrically opposed sides thereof.

9. A method of mounting a tire on a drop center wheel comprising the steps of:
   disposing a tire on a drop center wheel such that one bead is wholly between the wheel rims and part of the other bead is, at one location only, between the wheel rims;
   locating both beads at said one location in the drop center of the wheel; and
   applying forces on both sides of said one location to the tread region of the tire non-diametrically and non-tangentially to elongate the tire so that the remainder of said other bead will roll about a wheel rim into the space bewteen the wheel rims.

10. The method of claim 9 wherein said non-diametric, non-tangential forces are applied to the side of the tread region rearest said one location with respect to the plane of the tire.

11. A method of mounting a tire on a drop center wheel comprising the steps of:
    disposing a tire on a drop center wheel such that one bead is wholly between the wheel rims and part of the other bead is, at one location only, between the wheel rims;
    squeezing the beads together at said one location and urging them into the drop center of the wheel; and
    releasing the squeezing force on the beads while applying non-diametric, non-tangential forces to the tread region of the tire at spaced locations on both sides of said one location to elongate the tire while maintaining the beads at said one location within the drop center so that the remainder of said other bead becomes disposed between the wheel rims.

12. Tire servicing apparatus comprising:
a bed;
wheel clamp means mounted on said bed for movement between a wheel clamping position above said bed and a retracted position below said bed to free said bed of obstructions to enable use of the same for other purposes;
tire clamp and urging means for gripping a tire and for applying a moving force to a tire; and
means mounting said tire clamp and urging means adjacent said bed for movement
(a) toward and away from said wheel clamp means, and
(b) toward and away from said bed
said tire clamp and urging means comprising a pair of opposed jaws and a pusher member extending between said jaws and pivotally mounting said jaws for movement toward and away from each other.

13. The tire servicing apparatus of claim 12 wherein said wheel clamp means comprise at least two spaced plates having oppositely directed hook formations, each plate being pivoted to said bed below the surface thereof and at a location spaced from its hook formation and rotatable between a position wherein its hook formation is above said surface and a position wherein its hook formation is below said surface, and a cam surface on each said plate leading to the associated hook formation whereby as a hook formation emerges from below said surface, the corresponding cam surface will cam a wheel edge toward the hook formation to be gripped thereby.

14. A tire changer for changing large tires mounted on drop center wheels comprising:
an elongated frame;
a plurality of wheel clamps mounted on said frame for engaging a wheel and clamping the same to said frame, at least one of said clamps being mounted on said frame for movement relative to at least one other clamp between wheel clamping and unclamping positions;
a tire grasping and urging means on said frame and having opposed jaws movable towards and away from each other for gripping a tire on opposed side walls and compressing the same; and
means movably mounting said grasping and urging means on said frame so that said jaws will move in concert toward and away from said wheel clamps in a first direction generally transverse to the rotational axis of a wheel engaged by said clamps and in a second direction generally parallel to said axis in addition to being movable toward and away from each other to grip a tire;
whereby a tire gripped by said jaws through movement thereof toward each other may be urged in said first direction to locate one or both tire beads on one edge of the tire in the drop center of a wheel engaged by said clamps and urged in said second direction to effect relative movement between the tire and the wheel generally along said axis to mount and/or demount the tire from the wheel.

15. The tire changer of claim 14 wherein said frame is horizontally disposed.

16. The tire changer of claim 14 wherein said frame comprises the bed of a vehicle.

17. A tire changer for changing large tires mounted on drop center wheels comprising:
an elongated frame defining a base for said tire changer;
a plurality of wheel clamps mounted at spaced locations on said frame for engaging a wheel and clamping the wheel to said frame to hold the wheel on the frame in a predetermined plane against movement relative to the frame, at least one of said clamps being movably mounted on said frame for movement relative to at least one other clamp between wheel clamping and wheel unclamping positions;
means on said frame for moving said one clamp between said clamping and unclamping positions;
tire grasping and urging means mounted on said frame to one side of said clamps for movement generally within said plane toward and away from said clamps and for movement toward and away from said plane, said tire grasping and urging means including opposed jaws mounted for movement toward and away from each other and said plane so as to be able to grip a tire and position it in or remove it from said plane to effect mounting and/or demounting of a tire on a wheel clamped in said plane by said clamps;
means for moving said tire grasping and urging means geenrally within said plane toward and away from said clamps;
means for moving said tire grasping and urging means toward and away from said plane; and
means for moving said jaws toward and away from each other.

18. The tire changer of claim 17 wherein said frame comprises a horizontally disposed bed and all of said clamps are movably mounted thereon for movement between said clamping and unclamping positions, said clamps when in said clamping position having wheel engaging formations above said bed, said clamps when in said unclamping position being wholly below the upper surface of said bed.

19. The tire changer of claim 17 wherein said tire grasping and urging means further includes tire engaging pusher means in close proximity to said jaws and on the side thereof remote from said clamps, said pusher means including at least one elongated surface facing said clamps and extending generally transverse to said plane and movable toward and away from said clamps generally in said plane.

20. The tire changer of claim 17 in combination with a vehicle, said elongated frame comprising a bed on said vehicle, and a crane mounted on said vehicle for loading and unloading wheels and/or tires onto and from said bed, said clamps being movable relative to said bed to a stowed position freeing said bed for receipt of wheels and/or tires for transportation purposes.

21. The tire changer of claim 17 further including opposed means for engaging a tire non-diametrically and for applying an elongating force thereto.

22. The tire changer of claim 21 wherein said engaging and applying means comprise pushers movably mounted on said tire grasping and urging means for movement in said plane to engage a tire in the tread region thereof.

23. A tire changer for changing tires mounted on drop center wheels comprising:
an elongated frame defining a base for said tire changer;

a plurality of wheel clamps mounted at spaced locations on said frame for engaging a wheel and clamping the wheel to said frame to hold the wheel on the frame in a predetermined plane against movement relative to the frame, at least one of said clamps being movably mounted on said frame for movement relative to at least one other clamp between wheel clamping and wheel unclamping positions;

means on said frame for moving said one clamp between said clamping and unclamping positions;

tire grasping and urging means mounted on said frame to one side of said clamps for movement generally within said plane toward and away from said clamps and for movement toward and away from said plane, said tire grasping and urging means including opposed jaws mounted for movement toward and away from each other and said plane so as to be able to grip a tire and position it in or remove it from said plane to effect mounting and/or demounting of a tire on a wheel clamped in said plane by said clamps, said tire grasping and urging means further including a pair of pusher shoes, one on each side of said jaws, and mounted for movement generally within said plane to non-diametrically engage a tire in the tread region thereof and applying a force thereto to urge one side of a tire against a wheel and thereby cause the tire opening to elongate;

means for moving said tire grasping and urging means generally within said plane toward and away from said clamps;

means for moving said tire grasping and urging means toward and away from said plane;

means for moving said jaws toward and away from each other; and means for moving said pusher shoes toward and away from a tire.

* * * * *